United States Patent [19]

Smith

[11] 4,089,035
[45] May 9, 1978

[54] HAND-HELD DETONATOR

[75] Inventor: Don H. Smith, Dallas, Tex.

[73] Assignee: Tyler Holding Company, Lewisville, Tex.

[21] Appl. No.: 655,148

[22] Filed: Feb. 4, 1976

[51] Int. Cl.² .............................................. F23Q 7/02
[52] U.S. Cl. ................................ 361/251; 102/70.2 R; 320/1
[58] Field of Search ..................... 317/80; 102/70.2 R; 89/28 R; 320/1; 361/251

[56] References Cited

U.S. PATENT DOCUMENTS

| | | | |
|---|---|---|---|
| 2,644,117 | 6/1953 | Schmitt et al. | 317/80 |
| 2,903,625 | 9/1959 | Doerpinghaus | 317/80 |
| 2,961,583 | 11/1960 | Sorensen | 320/1 |
| 3,141,114 | 7/1964 | Jenkins et al. | 317/80 |
| 3,448,339 | 6/1969 | Maithonis et al. | 317/80 |
| 3,538,414 | 11/1970 | Janoski | 320/1 |
| 3,559,929 | 2/1971 | Lindsay, Jr. | 89/28 R |
| 3,704,393 | 11/1972 | Digney, Jr. et al. | 317/80 |
| 3,717,794 | 2/1973 | Yates et al. | 317/80 |
| 3,721,884 | 3/1973 | Thakore | 317/80 |
| 3,878,790 | 4/1975 | Meyer | 317/80 |

*Primary Examiner*—J. V. Truhe
*Assistant Examiner*—Clifford C. Shaw
*Attorney, Agent, or Firm*—Richards, Harris & Medlock

[57] ABSTRACT

The specification discloses a hand-held detonator or blasting device which includes a rigid housing dimensioned to be held in the hand of an operator. A pair of binding posts extend from the housing for attachment to an explosive charge. First and second switches are mounted on the housing and a battery and capacitor are disposed within the housing. An oscillator is provided for being connected to the battery in response to operation of the first switch to generate an A.C. signal. A transformer is connected to the output of the oscillator to apply the A.C. signal to full-wave rectifying circuitry which produces a D.C. signal in order to charge the capacitor to a predetermined voltage level. Circuitry is responsive to operation of the second switch to disconnect the capacitor from the battery and to connect the capacitor across the binding posts in order to discharge the voltage stored thereon to detonate the explosive charge. Numerous safety features are incorporated within the device to prohibit undesired detonation of the explosive charge.

8 Claims, 3 Drawing Figures

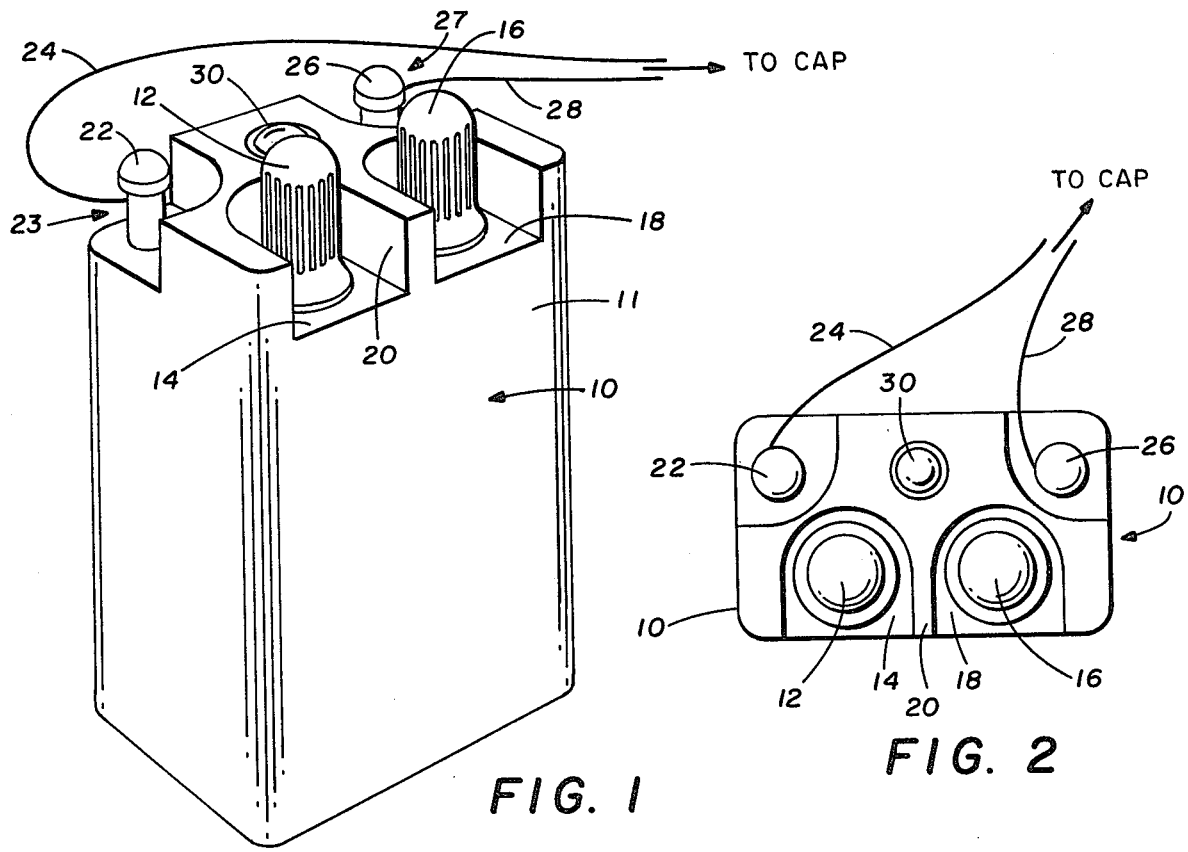
FIG. 1
FIG. 2
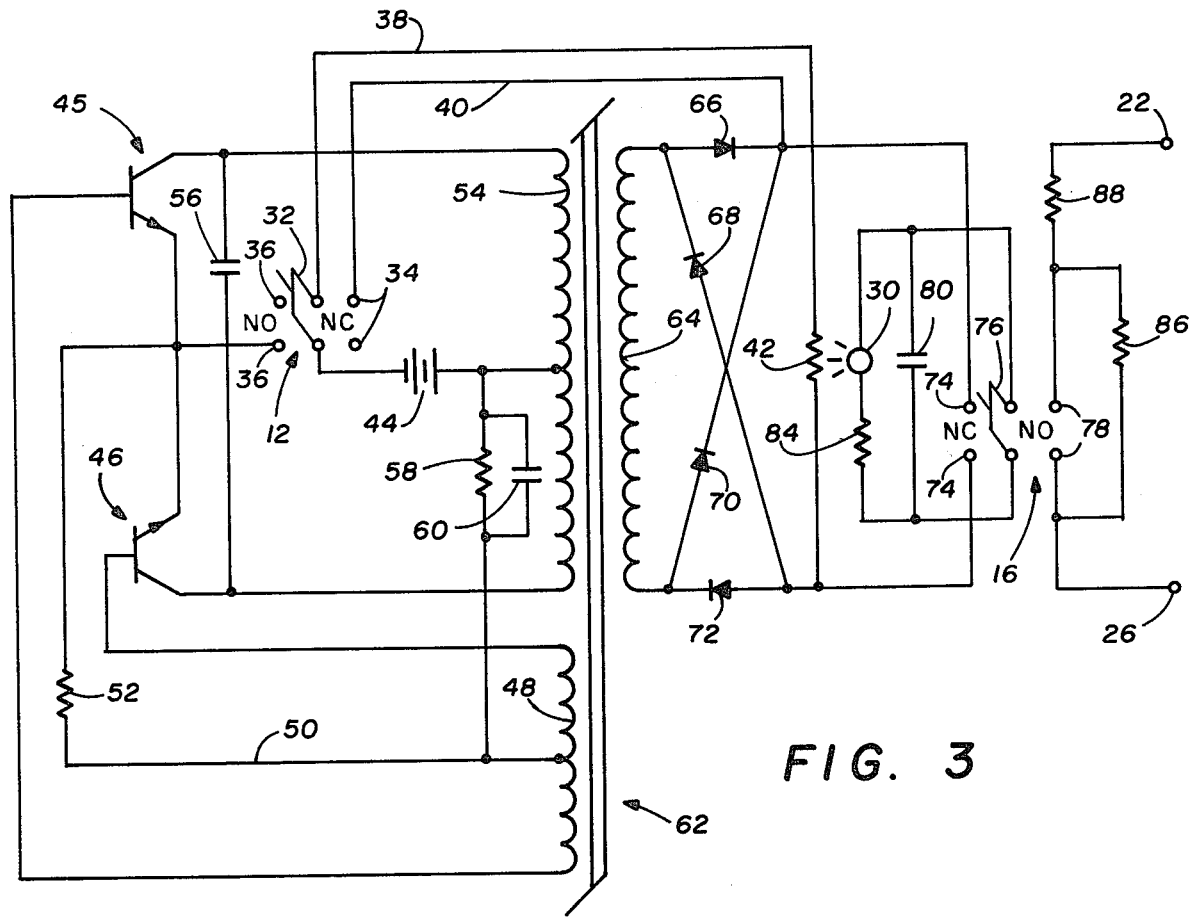
FIG. 3

HAND-HELD DETONATOR

FIELD OF THE INVENTION

This invention relates to blasting devices, and more particularly relates to a hand-held detonator for generating an electrical charge for igniting an explosive charge.

THE PRIOR ART

A wide variety of devices have been heretofore developed for detonating explosive charges such as dynamite and the like. One of the most common types of detonators includes one or more batteries which charges one or more capacitors, the capacitors then being discharged to detonate the explosive charges. The majority of such prior battery/capacitor blasting devices have been bulky and heavy, and thus were not useful as a portable hand-held detonating device.

Many uses of explosives occur at relatively inaccessible locations, and the use of heavy non-portable blasting devices is undesirable. A need has thus arisen for a portable hand-held device which may be utilized to ignite explosive charges.

An example of a hand-held blasting device is disclosed and claimed in U.S. Pat. No. 3,717,794 by Patrick A. Yates et al, issued Feb. 20, 1973 and entitled "Blasting Device". However, previously developed portable detonators have not been completely satisfactory in providing a high voltage output from a small battery, while incorporating safety features to prevent undesirable and hazardous operation.

SUMMARY OF THE INVENTION

In accordance with the present invention, a blasting device is provided which substantially overcomes and eliminates problems heretofore associated with prior devices. The present invention provides a portable hand-held device which generates a very high detonating voltage, and yet which includes many safety features to prevent hazardous operation. For example, the present invention includes two switches which must be independently operated in a predetermined sequence in order to enable firing of the detonator. The present invention prevents detonating operation if the two buttons are improperly operated, and allows any charge inadvertently stored on a capacitor to automatically bleed off. In case one or both of the switches short, a resistance is provided to discharge the voltage output across the device to prevent undesired detonation. In addition, resistance is provided across the terminals of the device to prevent deterioration of the switching contacts by shorting of the terminals. The present circuit is constructed so that a charged capacitor is completely disconnected from the charging circuit when discharged to prevent erroneous firing.

In accordance with another aspect of the present invention, a hand-held blasting device includes a rigid housing dimensioned to be held in the hands of an operator. Binding posts are disposed on the housing for attachment to an explosive charge. First and second switches are mounted on the housing for actuation by the fingers of the operator. A partition extends from the housing between the switches to protect against inadvertent actuation of one switch during actuation of the other switch. A battery and capacitor are mounted within the housing. Circuitry is operable in response to a predetermined sequence of operation of the switches for charging the capacitor from the battery and for connecting the charged capacitor to the binding posts.

In accordance with yet another aspect of the invention, a device is provided to detonate an explosive charge which includes a housing having binding posts for connection to wires leading to an explosive charge. First and second switches are mounted on the housing and each includes two operating positions. A battery and a capacitor are connected within the housing. Charging circuitry is responsive to actuation of the first switch for connecting the capacitor to receive charging current from the battery. Discharging circuitry is responsive to actuation of the second switch for disconnecting the capacitor from the charging circuitry and for coupling the capacitor to the binding post to discharge the capacitor. Circuitry is provided to dissipate electrical charge across the binding post if no load is connected thereto.

In accordance with yet another aspect of the invention, a portable device is provided for detonating an explosive charge. The device includes a housing with a pair of binding posts and which is dimensioned to be held in the hands of an operator. First and second switches are mounted on the housing. A battery and a capacitor are connected within the housing. An oscillator is provided to be connected to the battery in response to operation of the first switch for generating an A.C. signal. A toroid transformer is connected to the output of the oscillator. A rectifier is connected between the transformer and the capacitor for applying a D.C. signal to charge a capacitor. Circuitry is responsive to operation of the second switch for disconnecting the capacitor from the battery and for connecting the capacitor across the binding posts.

DESCRIPTION OF THE DRAWINGS

For a more detailed description of the present invention and for further objects and advantages thereof, reference is now made to the following description taken in conjunction with the acompanying drawings, in which:

FIG. 1 is a perspective view of the present hand-held detonator;

FIG. 2 is a top view of the detonator shown in FIG. 1; and

FIG. 3 is an electrical schematic diagram of the circuitry within the detonator device shown in FIG. 1.

DESCRIPTION OF THE PREFERRED EMBODIMENT

Referring to FIG. 1, the hand-held detonator of the present invention is identified generally by the numeral 10. The detonator comprises a generally rectangular housing 11, preferably made from lightweight rigid plastic or the like, and which is dimensioned to be held in the hands of the operator. For example, suitable dimensions of the housing 11 may comprise a height of slightly under 4-inches and a width of about 2.5-inches, with a thickness of slightly less than 1.5-inches. With such dimensions, the housing 11 may be placed in the shirt pocket of the user and therefore is quite convenient for use in the field.

In the upper end of the housing 11, a first pushbutton switch 12 is disposed within a cutout or countersunk portion which forms a depression 14. Similarly, a second pushbutton switch 16 is disposed within a cutout portion forming a depression 18. The cutout portions form a partition 20 between the two switches 12 and 16 in order to prevent simultaneous depression of both switches by a single thumb or finger of the user. Each of the depressions 14 and 18 are dimensioned to receive a separate finger or thumb of a user, and thus the detonator 10 may conveniently be held in both hands of the operator and a thumb of one hand used to depress switch 12 and the thumb of the other hand used to depress the switch 16. The pushbutton switches 12 and 16 may comprise any suitable type of double-pole double-throw pushbutton switch, but preferably include an outer rubber or flexible plastic cover as illustrated. The switches 12 and 16 comprise double-pole double-throw switches, and each of the switches must be depressed each time a change of switch operation is desired.

A binding post 22 is disposed within a third cutout portion 23 formed in one upper corner of the device. A wire 24 may be connected to the binding post for connection to a detonation cap in the well-known manner. Similarly, a binding post 26 is disposed in a depression 27 formed in the opposite upper corner of the device. Binding post 26 may be connected to a wire 28 for connection to the detonation cap. A light 30 is disposed in the central portion of the top of the housing 11. Light 30 is illuminated when the capacitor is charged during operation of the device, as will be subsequently disclosed. Light 30 may comprise a light emitting diode or a conventional electric lamp.

FIG. 2 is a top view of the device 10 and illustrates how the partition 20 separates the switches 12 and 16. The switches 12 and 16 are protected by the side walls of the depressions 14 and 18 and the switches are not therefore subject to inadvertent actuation. Similarly, the binding posts 22 and 26 are protected due to being set in the depressions 23 and 27.

FIG. 3 is an electrical schematic of the circuitry of the present invention. The first switch 12 may be seen to include a movable switch element 32 which is normally closed with terminals 34, but which may be switched by depression thereof into contact with normally opened contacts 36. The movable switch element 32 is connected to leads 38 and 40. Lead 40 is connected in series with a low value resistance 42. Switch contact 32 is also connected to a terminal of a nine-volt battery 44 as illustrated.

One of the contacts 36 is connected to the emitters of transistors 45 and 46. The bases of transistors 45 and 46 are connected to opposite ends of a transformer winding 48. The winding 48 is center-tapped and connected to a lead 50 which is connected through a resistor 52 to the emitters of transistors 45 and 46. The collectors of transistors 45 and 46 are connected to opposite ends of a transformer winding 54. The capacitor 56 is connected across the winding 54 in the manner illustrated. The winding 54 is center-tapped and is connected to one terminal of the battery 44, as well as being connected through an RC circuit comprising resistor 58 and capacitor 60. The other terminal of the RC circuit is connected to the center-tap of the winding 48. Windings 54 and 48 constitute the primary of a toroid transformer 62. In the preferred embodiment, the toroid transformer includes a ferrite core.

A secondary coil 64 is wound about the toroid core and a rectifying bridge comprising four diodes 66, 68, 70 and 72 is interconnected across the secondary coil 64. The rectifying bridge is connected to leads 38 and 40 as illustrated. The rectifying bridge is also connected to switch 16 by a switch contact 74 upon which is normally closed a movable switch member 76. Normally open switch contacts 78 are adapted to be placed in contact with the movable switch member 76 upon actuation of the pushbutton switch. Movable switch member 76 is connected across a capacitor 80 for storage of charge in the manner to be subsequently described. The light 30 is connected across capacitor 80 in series with a resistor 84. A resistance 86 is connected across the contacts 78. A resistance 88 is connected between one of the contacts 78 and the binding post 22. The other contact 78 is connected directly to the binding post 26.

In operation of the circuitry shown in FIG. 3, the movable switch member 32 of switch 12 is normally closed against terminals 34. Movable switch contact 76 of switch 16 is normally closed against switch contact 74. In this position, the low value resistor 42 is always connected across the capacitor 80 in the normally operating position. Thus, if any charge is left on the capacitor 80, the charge would dissipate through the resistor 42 to prevent unintended detonation in case switch 16 was inadvertently depressed prematurely.

When it is desired to detonate a charge, the switch 12 is depressed by one of the fingers of the operator. This moves the movable switch member 32 into contact with the switch contacts 36. Power is then applied from the battery 44 to the transistors 45 and 46. The transistors, along with the associated circuitry, begin oscillation at a predetermined frequency determined by the RC circuit comprising resistor 58 and capacitor 60. The output of the oscillator comprises a chopped alternating waveform which is applied to the toroid transformer. The impedance of the oscillator circuitry is matched with the impedance of the core material of the transformer to provide a high degree of power transmission without power loss and substantial heat being generated. The winding 48 is operable to provide suitable biasing for the oscillator circuitry.

The alternating waveform provided to the transformer 62 is applied from the secondary coil 64 to the full-wave rectifier comprising diodes 66–72. The resulting D.C. output is applied through the normally closed switch member 76 to the capacitor 80. Capacitor 80 then begins to charge to a predetermined level. In the desired embodiment of the invention, the voltage level supplied by the secondary coil 64 is approximately 130-volts, depending upon the internal resistance of the battery 44 and the associated circuitry. After the capacitor 80 begins charging, the lamp 30 is illuminated to indicate to the user that the capacitor 80 has a predetermined charge thereon. When the lamp 30 is illuminated, the switch member 76 is operated to contact the switch contact 78. The voltage stored upon the capacitor 80 is then discharged across the resistor 88 and is applied to the binding posts 22 and 26. The voltage is then applied through the wires 24 and 28 to ignite the detonation cap in the well-known manner.

The present invention incorporates numerous safety features. As previously noted, the resistance 42 is normally connected across the capacitor 80 to bleed off any undesirable charge thereon. Moreover, an important aspect of the invention is that actuation of the switch 16 completely disconnects the charging capacitor 80 from the charging circuitry such that it is impossible to add additional charging current to the capacitor. This prevents both switches from being simultaneously depressed to attempt to generate continuous charging voltages. In accordance with the present invention, only when the switches are pushed in the predetermined sequence can charging voltage be delivered by the unit. Resistor 86 may comprise for example a 2,000 ohm resistance which is always connected across the binding posts 22 and 26 to provide a continuous load, such that in the unlikely condition that one or more shorts occur, any undesired output across the binding posts 22 and 26 will be shorted by the resistor 86. The resistance of resistor 86 is sufficiently low that only a minor proportion of the charging voltage is dissipated by the resistor during actual firing of the invention.

Other safety features of the invention relate to the fact that the lamp 30 is only illuminated when the device is ready to fire. After the capacitor is discharged, the lamp 30 is de-energized. The resistance 88 is a very small resistance, such as one ohm, and is provided to prevent degradation of the switching contact by shorting across the binding posts 22 and 26, by providing a continuous load thereacross.

The construction of the housing 11, and particularly the depressions 14 and 18 and the partition 20, prevents simultaneous operation of the switches 12 and 16 by a single finger. Thus, the use of two different fingers by the operator tends to insure that the switches will not be simultaneously depressed and that the proper operation of the switches will be provided.

It will thus be seen that the present invention contemplates a very small, lightweight detonator which may be easily carried in the field by an operator, yet one which provides a very high discharge voltage to provide a positive detonation. The present invention includes numerous safety features which provide a great degree of safety and reliability to the device.

Whereas the present invention has been described with respect to specific embodiments thereof, it will be understood that various changes and modifications will be suggested to one skilled in the art, and it is intended to encompass such changes and modifications as fall within the scope of the appended claims.

What is claimed is:

1. A hand-held blasting device comprising:
    a rigid housing having top, bottom and side walls dimensioned to be held in the hands of an operator during operation,
    a first pair of spaced apart depressions formed in said top wall of said housing, each of said first pair of depressions including base portions and side wall portions extending from said base portions to said top wall of said housing,
    binding posts mounted in said base portions of said first depressions and extending parallel to said side walls of said first depressions for attachment to an explosive charge, said binding posts being protected by said first depression from inadvertent contact with the fingers of the operator,
    a second pair of spaced apart depressions formed in said top wall of said housing and being disposed between said first pair of depressions,
    first and second switches mounted in said second pair of depressions on said top wall of said housing for actuation by the fingers of the operator,
    each of said second pair of depressions including base portions and side wall portions extending from said base portions to said top wall of said housing and forming a wall partition between said first and second switches, said second pair of depressions dimensioned for receiving the fingers of the operator and said wall partition protecting against inadvertent actuation of one of said switches during actuation of the other one of said switches, and against contacting said binding posts and to encourage the use of fingers on opposite hands for actuating said switches,
    a battery mounted within said housing,
    a capacitor mounted in said housing, and
    circuitry operable in response to operation of said first switch for connecting said capacitor to said battery for charging said capacitor from said battery and said circuitry further operable in response to operation of said second switch for connecting the charged capacitor across said binding posts to detonate an explosive charge.

2. The blasting device of claim 1 wherein each of said switches comprises pushbutton switches.

3. The blasting device of claim 1 and further comprising:
    a light mounted in the top of said housing for being illuminated when said capacitor is charged to a predetermined magnitude.

4. The blasting device of claim 1 wherein said housing has a width for being held in both hands of an operator and said switches being spaced to enable each to be depressed by a finger on a different hand of the operator while the housing is being held by the operator.

5. The blasting device of claim 1 wherein said circuitry includes:
    an oscillator for being connected to said battery in response to operation of said first switch for generating an A.C. signal,
    a transformer connected to the output of said oscillator, and
    rectifying circuitry connected between said transformer and said capacitor for applying a D.C. signal to charge said capacitor.

6. The blasting device of claim 1 and further comprising:
    means for dissipating electrical charge across said binding posts if no load is connected thereto.

7. The blasting device of claim 1 and further comprising:
    a resistance connected across said binding posts for discharging said capacitor when no explosive charge is connected to said binding posts.

8. The blasting device of claim 1 and further comprising:
    a resistance connected across said capcitor when said first and second switches are connected in inoperative positions.

* * * * *